(12) United States Patent
Prasanna et al.

(10) Patent No.: US 12,361,292 B2
(45) Date of Patent: Jul. 15, 2025

(54) SYSTEM AND METHOD FOR PREDICTIVE FOLIAGE IMPINGEMENT AND WILDFIRE MANAGEMENT USING GENERATIVE ADVERSARIAL NETWORK

(71) Applicant: VoltSense, Inc., Vallejo, CA (US)

(72) Inventors: Dinesh Prasanna, Vallejo, CA (US); Sunny Gupta, Daly City, CA (US); Joseph J. Tavormina, Incline Village, NV (US); John Armanini, Vallejo, CA (US); Shah Monemzadeh, Vallejo, CA (US); Robert Philip Eisenberg, Boynton Beach, FL (US)

(73) Assignee: VoltSense, Inc., Vallejo, CA (US)

( * ) Notice: Subject to any disclaimer, the term of this patent is extended or adjusted under 35 U.S.C. 154(b) by 996 days.

(21) Appl. No.: 17/391,539

(22) Filed: Aug. 2, 2021

(65) Prior Publication Data

US 2022/0036199 A1     Feb. 3, 2022

Related U.S. Application Data

(60) Provisional application No. 63/059,911, filed on Jul. 31, 2020.

(51) Int. Cl.
*G06N 3/088* (2023.01)
*G06N 3/045* (2023.01)

(52) U.S. Cl.
CPC ............ *G06N 3/088* (2013.01); *G06N 3/045* (2023.01)

(58) Field of Classification Search
CPC .................................................... G06N 3/088

USPC ........................................................... 706/20
See application file for complete search history.

(56) References Cited

U.S. PATENT DOCUMENTS

| | | | |
|---|---|---|---|
| 2005/0094335 A1* | 5/2005 | Schweitzer, III | H02H 3/40 361/64 |
| 2013/0205900 A1* | 8/2013 | Nulty | H02J 13/00 73/514.01 |
| 2021/0390396 A1* | 12/2021 | Fan | G06N 3/08 |

OTHER PUBLICATIONS

Fekri et al, , Generating Energy Data for Machine Learning with Recurrent Generative Adversarial Networks, Dec. 26, 2019, Energies (Year: 2019).*
Wikipedia, power factor, Mar. 17, 2019 (Year: 2019).*
Wikipedia, power-flow study, Mar. 26, 2019 (Year: 2019).*
"Distribution Fault Location—Field Data and Analysis," Electric Power Research Institute, Final Report, Dec. 2006, Product No. 1012438.

(Continued)

*Primary Examiner* — Austin Hicks
(74) *Attorney, Agent, or Firm* — Meunier Carlin & Curfman LLC

(57) ABSTRACT

An exemplary system and method are disclosed for identifying anomalies relating to distribution power line disturbances and faults indicative of foliage impingement and potential equipment failure. The exemplary system and method employ neural network-based models such as generative adversarial networks models that can continuously monitor for electrical-signal anomalies to locate faults, predict power outages and safety hazards, thereby reducing the likelihood of wildfires. The exemplary system and method can beneficially learn and update its neural network models in a continuous and unsupervised manner using a live stream of sensor inputs.

20 Claims, 9 Drawing Sheets

(56) References Cited

OTHER PUBLICATIONS

"A Simple Method for Determining Fault Location on Distribution Lines," Thomas Covington, Tim Stankiewicz, and Rick Anderson, Fayetteville Public Works Commission, presented at 44th Annual Western Protective Relay Conference, Spokane, Washington, Oct. 17-19, 2017.
"Fault Location using Distributed Sensors on Distribution Feeders," Vaibhav Donde, Daniel Partridge, and Neelofar Anjum, Pacific Gas and Electric presented at CIGRE US National Committee 2016 Grid of the Future Symposium.
"Distribution Fault Location: Circuit Model Errors, Current-Only Fault Location, and Momentary Fault Events" Dec. 2010. 50 pages.

* cited by examiner

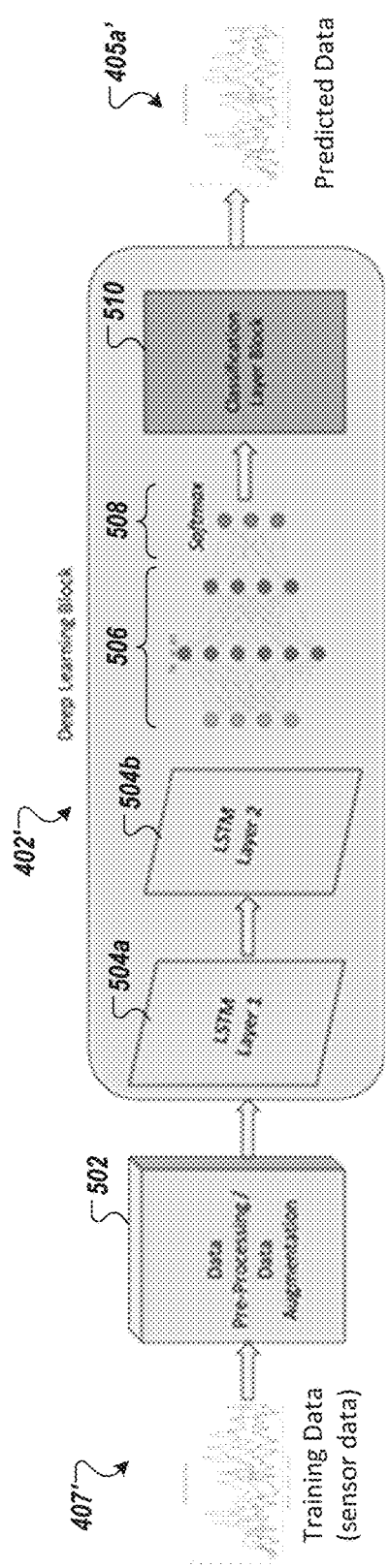
FIG. 5A
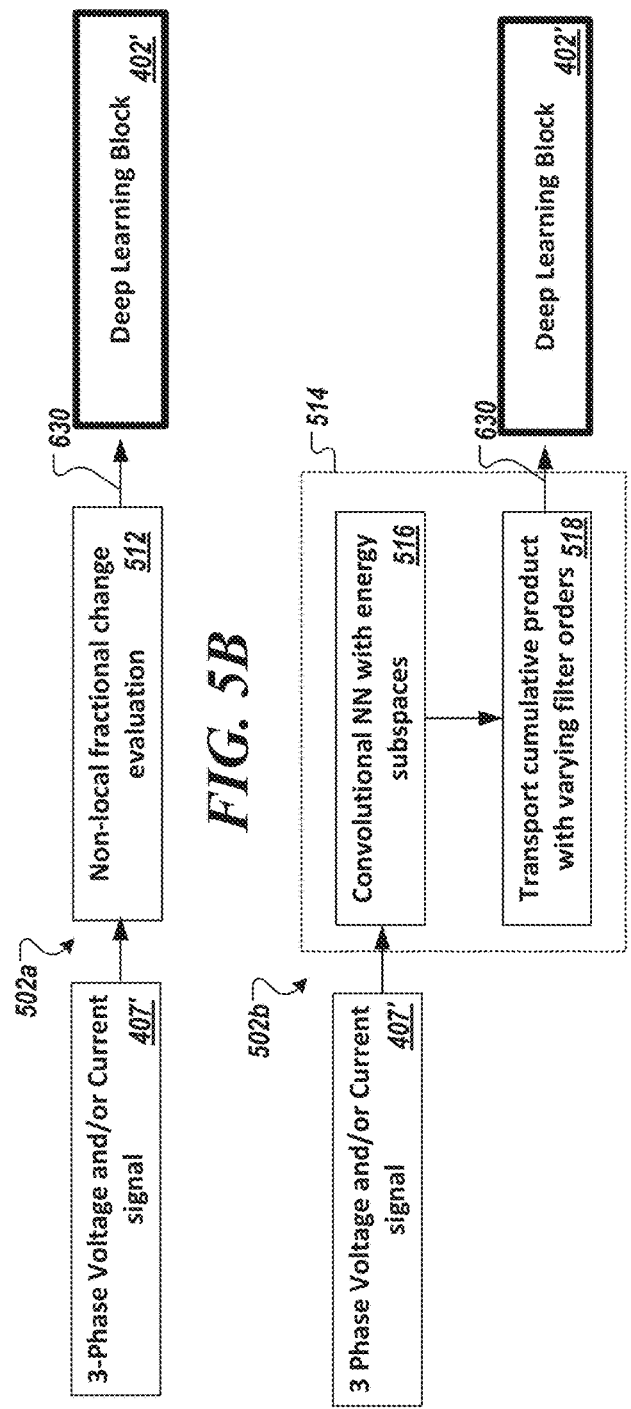
FIG. 5B
FIG. 5C

SYSTEM AND METHOD FOR PREDICTIVE FOLIAGE IMPINGEMENT AND WILDFIRE MANAGEMENT USING GENERATIVE ADVERSARIAL NETWORK

RELATED APPLICATION

This application claims priority to, and the benefit of, U.S. Provisional Patent Application No. 63/059,911, filed Jul. 31, 2020, entitled, "A SYSTEM AND METHOD FOR PREDICTIVE, FOLIAGE MANAGEMENT NEAR POWER LINES, EQUIPMENT FAILURE, AND POWER FLOW ANALYSIS," which is incorporated by reference herein in its entirety.

BACKGROUND

Electric utility companies are focused on wildfire mitigation measures and prediction. In being able to recognize the occurrence of momentary faults that signal the potential ignition of a fire and determine the location of the faults, utility companies can direct maintenance crew to that location to address an impinging foliage to reduce the risk of wildfires. Preventive maintenance can also improve the operation of utility infrastructure and equipment.

Electric Power Research Institute ("EPRI") has collected a large amount of fault data and analyzed this data using a variety of fault-location approaches and models. While physics-based models can attain relatively high model fidelity and accuracy, the models have to be maintained at a high cost in terms of engineering resources. The models are also created with the specific topology of a given electric infrastructure to which engineering resources have to be expended to update them when a change is made to the network.

There is a benefit to improving the detection of momentary faults.

SUMMARY

An exemplary system and method are disclosed for identifying electrical signal anomalies relating to distribution power line disturbances and faults indicative of foliage impingement and potential equipment failure. The outputs can be used, e.g., to assist in setting priority for predictive maintenance and guide foliage management to prevent power outages and fire as well as to restore power. The exemplary system and method employ neural-network-based reinforcement learning models such as generative adversarial network models (also referred to herein as "generative adversarial nets") that can continuously monitor for the electrical-signal anomalies to locate faults, predict power outages, and safety hazards, thereby reducing the likelihood of wildfires. In addition, the exemplary system and method can be used to predict/estimate or observe joule losses, equipment failure, line sag, transformer failures in a power distribution network.

The exemplary system and method can beneficially learn and update its neural network models in a continuous and unsupervised manner using a live stream of sensor inputs, and thus it can dynamically adjust for changes in the environment, sensor configuration, and underlying electrical network configurations with little or minimum inputs from engineering or data science resources. With models being updated continuously in a reinforcement learning-based manner, the exemplary system and method can maintain a model of the system that can more readily adapt to changes made to the environment or underlying electrical power network, and thus reducing the time for undesired anomalies to be observed. The reinforcement learning-based operation can be performed without the need for large amounts of training data (typically required for most neural networks), and updating such a network solution on a daily basis or weekly basis with new situations in a timely fashion requires computer resources beyond most fire and power line distribution operations.

The exemplary system and method can process each data stream uniquely, facilitating the ingestions for a set of heterogeneously-mixed sensors. Similarly, the exemplary system and method can process data acquired at different acquisitions speeds. To this end, high-speed data acquisition may be employed (e.g., a rate greater than 1 Mhz) to provide insights into high-frequency harmonics in power lines linked to equipment failure and/or fire risk signatures.

The term "neural network-based models" can refer to neural networks, generative adversarial networks, generative adversarial imputation networks, as well topological data analysis, a convolutional neural networks, regression neural networks, a regression random forest algorithm, or an ensemble of these methods.

The exemplary system and method can analyze data from sensors deployed in the power distribution network several miles apart to determine fault locations and assess the risk of fires due to vegetation proximity. The exemplary system and method can employ the same sensors and data for power factor, voltage, and current monitor of the electric power network.

In some embodiments, the generative adversarial networks are configured to modify the input data, e.g., via convolutional based calculus operator (e.g., fractional calculus) or an encapsulation neural network, to emphasize frequencies and waveforms of interest to increase the rate of adaption and continuous ongoing learning by the generative adversarial networks. The convolutional-based calculus operator can create additional signals for a reinforcement learning model, which is configured to detect, locate, and/or classify abnormal power lines events using an ensemble of sensors and machine learning operations.

The exemplary method and system can operate with power flow analysis and equipment failure signature analysis. In some embodiments, the power flow analysis and equipment failure signature analysis can provide initial states for the neural network-based models.

The exemplary system and method may employ distributed sensor and edge computing resources. Edge computing is a distributed computing paradigm that brings computation and data storage closer to the sources of data. To this end, individual voltage and current sensing equipment located at the edge of a distributed control network can also perform anomaly detection locally. Machine-learned foliage proximity and fire prediction models can be implemented in an application-specific integrated circuit to create an edge network of smart sensors for the power grid that reduces communication and cloud computing costs.

Current commercially available voltage, current, and power factor sensors and monitoring solutions do not use continuous reinforcement learning with anomaly detection nor fractional signal calculus nor incorporate data from multiple sensors with edge computing capabilities. These features alone and in combination can reduce the training time for a classifier model in view of changes to the environment and underlying electric network system, as well as reduce communication transmission of data, and thus cost, to cloud-based data systems.

In an aspect, a method is disclosed to predict foliage impingement and management by detecting anomalous event (executing at an edge sensor device, or remote/cloud server), the method comprising providing via a first classifier of a first trained neural network (e.g., discriminator) of a first generative adversarial-based network (GAN-based network) (e.g., generative adversarial imputative network (GAIN)), wherein the first GAN-based network is continuously configured using power line data set (e.g., comprising voltage, current, and/or power factor) acquired by a first sensor equipment operatively placed at a low voltage-side at a first location of a utility power distribution circuit; providing via a second classifier of a second trained neural network (e.g., discriminator) of a second GAN-based network, wherein the second GAN-based network is continuously configured using power line data set comprising voltage, current, and/or power factor acquired by a second sensor equipment operatively placed at a low voltage-side at a second location (e.g., miles away from the first location) of the utility power distribution circuit; determining, by one or more processors, via the first trained neural network, a first predicted output indicative of a presence of the anomalous event in proximity to the first sensor device; determining, by one or more processors, via the second trained neural network, a second predicted output indicative of a presence of the anomalous event in proximity to the second sensor device; and outputting, by the one or more processors, via a fault detection location operator, a location indicator of foliage impingement along the utility power distribution circuit wherein the output is used to predict foliage impingement at the location in the utility power distribution circuit (e.g., to prioritize maintenance, direct maintenance crew to the location for servicing, and guide foliage management).

In some embodiments, the method further includes estimating, on an ongoing basis, via a global generative adversarial network, the location indicator using the first predicted output and the second predicted output.

In some embodiments, the method further includes identifying the foliage impingement at the location in the utility power distribution circuit by triangulating the location using the first predicted output and the second predicted output, wherein the triangulation is constrained to a physical layout or map of the utility power distribution circuit.

In some embodiments, the method includes obtaining, by one or more processors of the first sensor equipment (e.g., comprising ASICs or processors), on a continuous ongoing basis, power line data comprising voltage, current, and/or power factor from sensors of the first sensor equipment; and retraining, by the one or more processors, on an ongoing basis, via reinforcement learning operations, the first generative adversarial network using the continuously obtained power line data.

In some embodiments, the first classifier of the first trained neural network of the first GAN is trained from 3-phase electrical data (e.g., comprising voltage, current, and/or power factor signals).

In some embodiments, the first classifier of the first trained neural network of the first GAN-based network is trained from 3-phase electrical data (e.g., comprising voltage, current, and/or power factor signals) evaluated through an encapsulation network, wherein the output of the encapsulation network is provided as input to the first GAN-based network (e.g., wherein the encapsulation network comprises a convolutional neural network configured to evaluate energy subspaces and transpose cumulative product with varying filter orders).

In some embodiments, the first classifier of the first trained neural network of the first GAN is trained from 3-phase electrical data (e.g., comprising voltage, current, and/or power factor signals) evaluated through a state-space module that frames the 3-phase electrical data in three-dimensional data space.

In some embodiments, the state-space module is configured to perform a fractional calculus operation to the 3-phase electrical data to generate additional inputs to the first GAN-based network.

In some embodiments, the method includes transmitting, by the one or more processors, power line data to a storage area network (SAN) (e.g., when the anomalous event is detected by the first classifier).

In some embodiments, the first classifier of the first trained neural network can classify abnormal power line events that are correlated and prioritized with foliage interaction and/or fire risk.

In some embodiments, the first classifier of the first trained neural network can detect foliage signatures type, locations of voltage faults, drops or surges/spikes on a secondary transformer in the utility power distribution circuit.

In some embodiments, the first classifier of the first trained neural network is further configured to output a second output associated with at least one equipment failure, line sag, and transformer failure in the utility power distribution circuit.

In some embodiments, the power line data set acquired from the first sensor equipment and the second sensor equipment sensor are further used to determine and/or monitor power flow efficiency in the utility power distribution circuit.

In some embodiments, the power line data set acquired from the first sensor equipment and the second sensor equipment sensor are further used to determine and/or monitor power factor across multiple phases at the first sensor equipment and/or the second sensor equipment sensor.

In another aspect, a system is disclosed comprising one or more processor; and a memory operatively coupled to the one or more processors, the memory having instructions stored thereon, wherein execution of the instructions by the one or more processors, cause the one or more processors to: provide, via a first classifier of a first trained neural network of a first GAN-based network, wherein the first GAN-based network is continuously configured using power line data set acquired by a first sensor equipment operatively placed at a low voltage-side at a first location of a utility power distribution circuit; provide via a second classifier of a second trained neural network of a second GAN-based network, wherein the second GAN-based network is continuously configured using power line data set comprising voltage, current, and/or power factor acquired by a second sensor equipment operatively placed at a low voltage-side at a second location of the utility power distribution circuit; determine, via the first trained neural network, a first predicted output indicative of a presence of the anomalous event in proximity to the first sensor device; determine, via the second trained neural network, a second predicted output indicative of a presence of the anomalous event in proximity to the second sensor device; and output, via a fault detection location operator, a location indicator of foliage impingement along the utility power distribution circuit; wherein the output is used to predict foliage impingement at the location in the utility power distribution circuit.

In some embodiments, the execution of the instructions by the one or more processors further causes the one or more processors to estimate, on an ongoing basis, via a global generative adversarial network, the location indicator using the first predicted output and the second predicted output.

In some embodiments, the execution of the instructions by the one or more processors further cause the one or more processors to identify the foliage impingement at the location in the utility power distribution circuit by triangulating the location using the first predicted output and the second predicted output, wherein the triangulation is constrained to a physical layout or map of the utility power distribution circuit.

In another aspect, a non-transitory computer-readable medium is disclosed having instructions stored thereon, wherein execution of the instructions by one or more processors of a remote-server or cloud-based analytical engine cause the one or more processors to provide, via a first classifier of a first trained neural network of a first GAN-based network, wherein the first GAN-based network is continuously configured using power line data set acquired by a first sensor equipment operatively placed at a low voltage-side at a first location of a utility power distribution circuit, provide via a second classifier of a second trained neural network of a second GAN-based network, wherein the second GAN-based network is continuously configured using power line data set comprising voltage, current, and/or power factor acquired by a second sensor equipment operatively placed at a low voltage-side at a second location of the utility power distribution circuit; determine, via the first trained neural network, a first predicted output indicative of a presence of the anomalous event in proximity to the first sensor device; determine, via the second trained neural network, a second predicted output indicative of a presence of the anomalous event in proximity to the second sensor device; and output, via a fault detection location operator, a location indicator of foliage impingement along the utility power distribution circuit; wherein the output is used to predict foliage impingement at the location in the utility power distribution circuit.

In some embodiments, the wherein execution of the instructions by the one or more processors causes the one or more processors to estimate, on an ongoing basis, via a global generative adversarial network, the location indicator using the first predicted output and the second predicted output.

BRIEF DESCRIPTION OF THE DRAWINGS

The accompanying drawings, which are incorporated in and constitute a part of this specification, illustrate embodiments and, together with the description, serve to explain the principles of the methods and systems.

FIG. 5A shows an example implementation of the deep learning block of the GAIN network of FIG. 4 in accordance with an illustrative embodiment.

FIGS. 5B and 5C each shows an example implementation of a processing data augmentation module that can operate with the deep learning block of the GAIN network of FIG. 4 in accordance with an illustrative embodiment.

DETAILED SPECIFICATION

An exemplary system and method are disclosed for identifying anomalies relating to distribution power line disturbances and faults indicative of foliage impingement and potential equipment failure. The exemplary system and method employ neural network-based models such as generative adversarial networks models that can continuously monitor for electrical-signal anomalies to locate faults, predict power outages and safety hazards, thereby reducing the likelihood of wildfires. The exemplary system and method can beneficially learn and update its neural network models in a continuous and unsupervised manner using a live stream of sensor inputs.

Figure 1:
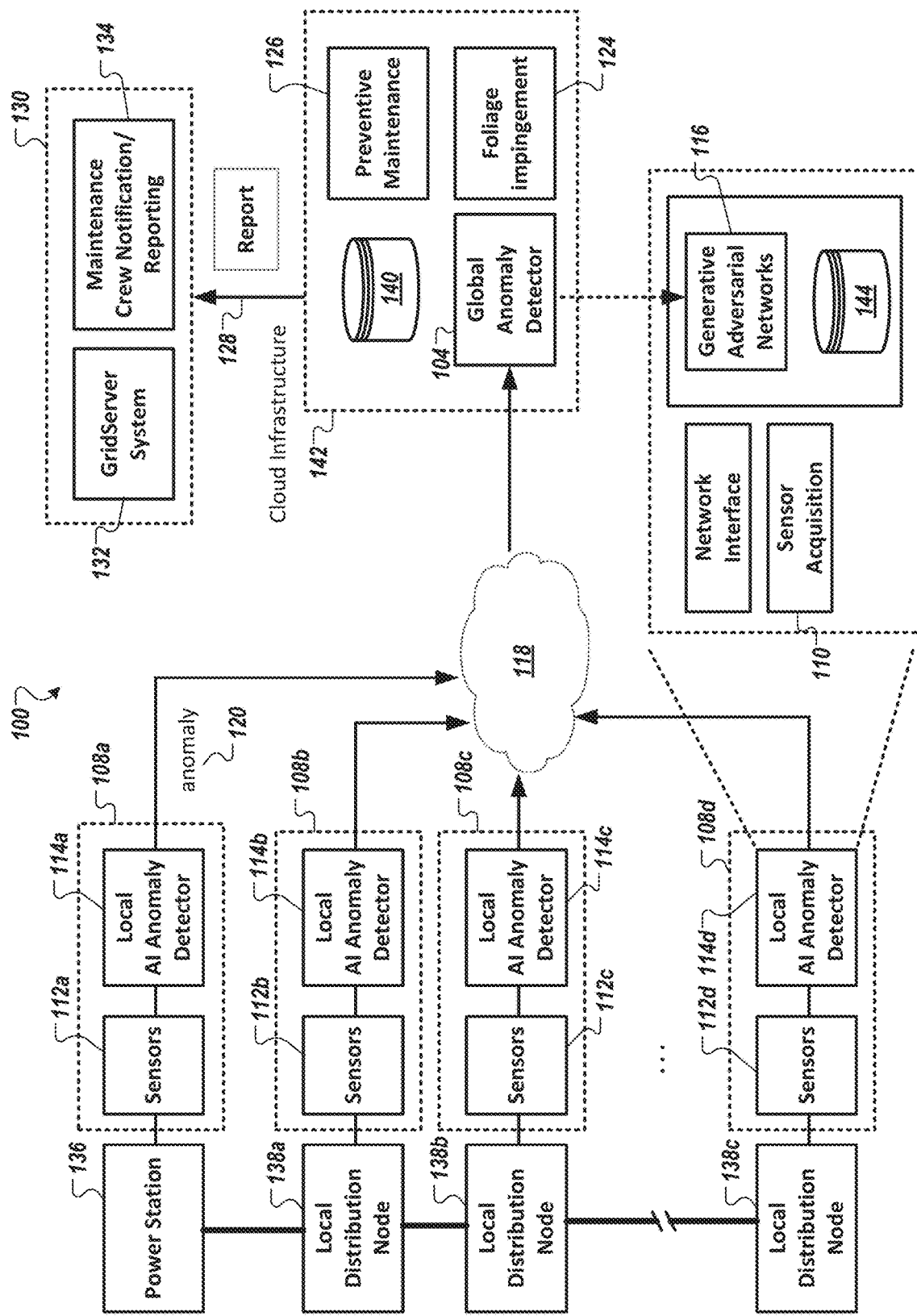
FIG. 1 shows a diagram of a wildfire mitigation system configured to provide predictive foliage impingement and wildfire management using a distributed control neural network system in accordance with an illustrative embodiment.

FIG. 1 shows an architecture for a wildfire mitigation system 100 that provides predictive foliage impingement and wildfire management using distributed control neural network system in accordance with an illustrative embodiment. The distributed control neural network system includes a network-wide analytics engine 104 (shown as "Global Anomaly Detector" 104) that is operatively connected to and operates with a plurality of edge-processing field sensor equipment 108 (shown as 108a, 108b, 108c, 108d).

Each of edge computing devices 108 includes both (i) measurement acquisition circuitries 110 (shown as "Sensor Acquisition" 110) that couple to a field sensor 112 (shown as sensors 112a, 112b, 112c, 112d) to measure current, voltage, or other measurand described herein and (ii) a local analytics processing unit to perform anomaly detection using an edge computing device 114 (shown as "Local AI Anomaly Detector" 114a, 114b, 114c, 114d). Each anomaly detection of the edge computing devices 114 includes a reinforcement-learning neural-network model 116, preferably a generative adversarial network-based model, shown as "Generative Adversarial Network" 116, configured to continuously monitor and update its model in an unsupervised manner using a live stream of local sensor inputs (from 112) to perform anomaly detection and/or signature detection. The reinforcement-learning neural-network model 116 can be configured as a generative adversarial imputation network (GAIN) model in certain implementation. Once an anomaly is detected/estimated at an edge computing device 108, the edge computing device 108 can transmit, over a network 118 (e.g., a high-speed wired or wireless communication network), a message or datagram 120 (shown as "anomaly" 120) having the indication/estimation of the anomaly to the network-wide analytics engine 104. In some embodiments, message or datagram 120 includes an identifier code of an anomaly and a score value. The reinforcement-learning neural-network model 116 (e.g., as a GAINS based hypervisor) can locate (e.g., via triangulation operation) and characterize, using the identifier and score, the anomalies such as foliage impingement, abnormal power flow loading, infrastructure failure, and predictive failure. The identifier in the message 120 can be labeled or unlabeled and is used by the network-wide analytics engine 104.

The network-wide analytics engine 104 is also configured with a neural-network model 122 (see FIG. 4), preferably another generative adversarial network-based model that can detect anomalies at the global or network-wide level. The neural-network model 122 can be configured as a generative adversarial imputation network (GAIN) model in certain implementations. The network-wide analytics engine 104 can also continuously monitor and update its models 122 in an unsupervised manner using a live stream of inputs (e.g., 120) from detected anomalies data provided by the edge computing device 108 to also perform anomaly detection and/or signature detection.

Anomaly detection (e.g., at the local analytics engine 114) can beneficially detect unknown voltage and current faults fairly reliably with a low false-positive rate while doing so with a dictionary of signatures to be defined for all possible abnormal power events. Because it can take months, if not years, of monitoring to create the library of faults followed by machine learning (ML) modeling to identify these signatures, anomaly detection systems (e.g., 104, 114) as described herein improves upon these system as it can be deployed more readily and with minimal or no supervised training. The anomaly detection system using generative adversarial network-based models can self-learn to readily identify new classes or types of anomalies in a power line network that deviates from an observed baseline. To this end, the local analytics engine 114 can learn individual particularities within its observable environment in the power line and distribution network.

As used herein, the term "anomaly detection" generally refers to a data analysis that can identify or observe outlier or anomalous events in data that have not been or had only been rarely observed before. As used herein, the term "signature detection" refers to the identification of unique waveform characteristics or patterns in an anomalous data set, e.g., after anomaly detection operation has been performed.

Subsequent to an anomaly being detected (e.g., by 104 or 114), the local analytics engine 114 and/or the network-wide analytics engine 104 can perform classification of the anomalous event, e.g., to determine whether they are associated with a foliage impingement event, distribution equipment associated failure or end of life. In some embodiments, the local analytics engine 114 can provide identifiers (e.g., in message 120) associated with a cluster of associated events from classification to the network-wide analytics engine 104. The network-wide analytics engine 104 can aggregate and clusters these identifiers, network-wide, from all the local analytics engine 114. Once a label has been correlated or assigned to the identifiers, subsequent receipt of such identifiers can be appropriately applied at the local analytics engine 114 or at the network-wide analytics engine 104.

The output of the network-wide analytics engine 104 can include (i) the likelihood or estimation of the presence of a foliage impingement and its localization within the electric distribution network (e.g., generated by a foliage impingement estimation module 124) and (ii) the presence and localization of potential equipment failure (e.g., generated by a preventive maintenance module 126). The output 128 (shown as "Report" 128) can be used to provide predictive maintenance of electrical distribution equipment located along the power lines and the substations. In the example shown in FIG. 1, the output 128 is provided to a utility grid management system 130, such as a GridServer system 132 as well as a utility maintenance crew management system 134 (shown as "Maintenance Crew Notification/Reporting" 134). Based on the output or report 128, the utilities can dispatch a maintenance crew to address the impinging foliage The foliage management module 124 can provide visualizations and real-time monitoring of wildfire risk. The foliage management module 124 can also provide power flow visualization in combination with foliage risk visualization, indicating detected electrical-signal anomaly or wildfire risk in an overlay manner.

In addition to generative adversarial network-based models, the local analytics engine 114 and/or the network-wide analytics engine 104 may perform anomaly detection and/or classification using other AI/machine learning systems, e.g., Long short-term memory (LSTM), convolutional neural networks, recurrent neural networks, regression models such as decision forest, linear model, random forest algorithms.

As discussed above, the distributed control neural network system includes the plurality of edge-processing field sensor equipment (e.g., 108a, 108b, 108c, 108d). In the example of FIG. 1, the field sensor equipment (108a, 108b, 108c, 108d) are connected to a power station 136 and a series of location distribution nodes 138 (shown as 138a, 138b, 138c). Sensors 112 may be placed at locations along a utility electrical distribution line to provide continuous measurements of the power grid. Examples of field sensors include but are not limited to line sensors that can measure current, voltage, and/or power flow. Field sensors can additionally measure environment and/or weather sensors that can measure temperature, relative humidity, and wind speed and direction. Field sensors can also include video data, e.g., from cameras. Field sensors can also include RF noise detectors that may detect cracked insulators.

The edge computing device 108 may also provide measured data to a historian data collection system 140 (e.g., a storage area network) that resides in the computing or cloud infrastructure 142 of the network-wide analytics engine 104. Edge computing device 108 may provide the high-resolution record of an RMS voltage or the sampled voltage or current waveforms for a selectable number of power cycles (e.g., 50/60 Hz) preceding the trigger event (typically 20 cycles) and following the trigger event (typically 40 cycles).

Generative Adversarial Network

Generative adversarial networks (GANs) employ approaches to generative modeling using deep learning methods such as convolutional neural networks. Generative modeling is an unsupervised learning task in machine learning that can automatically discover and learn the regularities or patterns in input data (typically image data, though in this example, time-series data) in such a way that the model can be used to generate or output new examples that plausibly could have been drawn from the original dataset.

GANs are an eloquent way of training a generative model by framing the problem as a supervised learning problem using two sub-models: first, a generator model that is trained to generate new examples, and a second discriminator model that classifies examples as either real (from the domain) or fake (generated). The two models are trained together in a zero-sum game in an adversarial manner until the discriminator model is fooled, e.g., about half the time, meaning the generator model is generating plausible examples of anomalous signals, e.g., associated with foliage interaction with power lines and/or equipment failure.

GAN's generator models, in operating in this adversarial configuration with the discriminator, can generate data with similar characteristics as the real input data allowing the system to learn specific anomalies that vary from baseline. The exemplary system can be deployed and trained in the field, and when the approximation is valid, that is, when in this way a limited training set contains sufficient data to provide good estimates of the underlying joint probabilities, the system would provide an indication or an estimation of the likelihood of the anomalous event.

Generative adversarial imputation networks (GAINs) (also referred to as generative adversarial imputation nets) are generative adversarial-based networks that employ a machine learning data imputation approach that can substitute missing data in a model more accurately and efficiently particularly for a model that has not yet been evaluated in big training datasets.

Example Edge Field Sensor Equipment

Figure 2A:
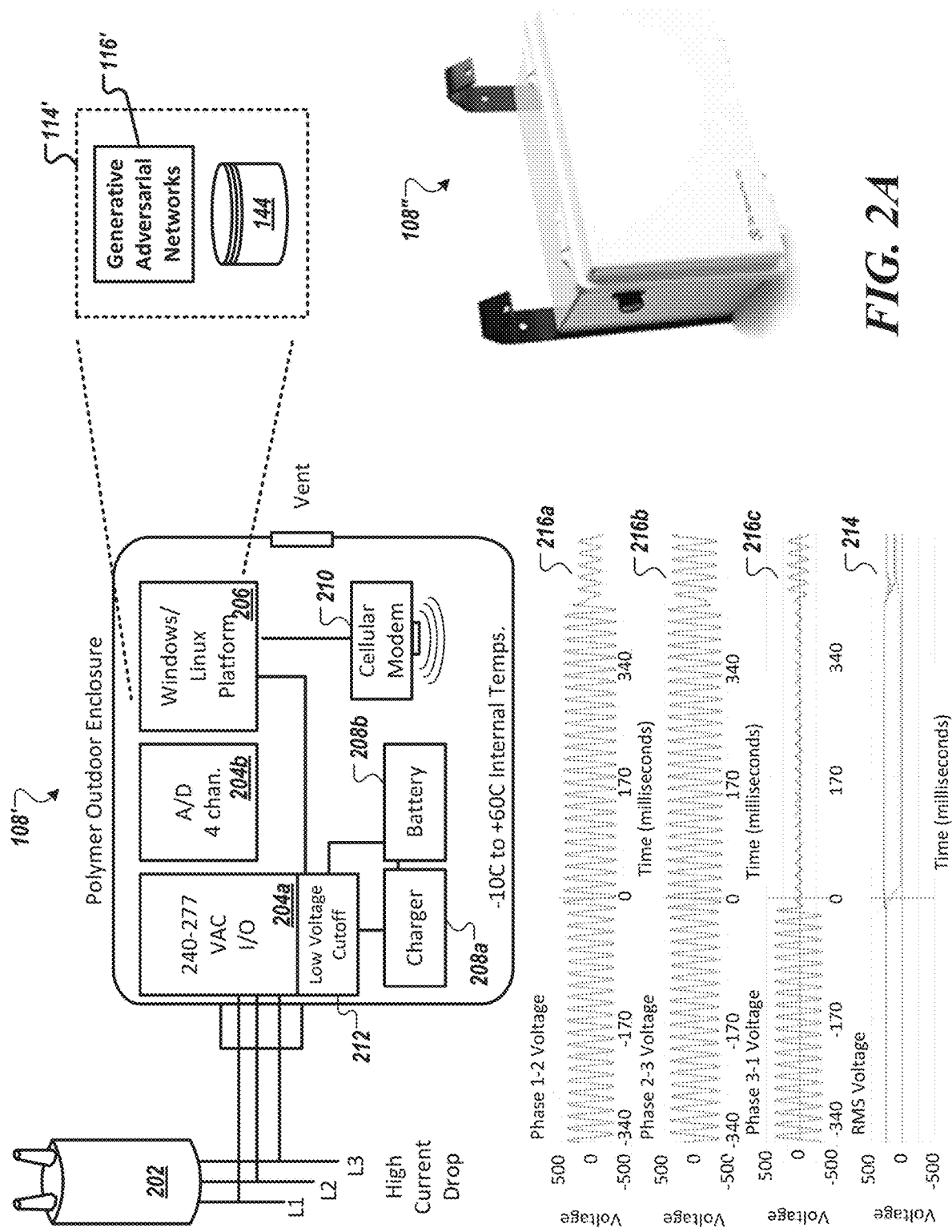
FIG. 2A shows an example edge-processing field sensor equipment that can be installed and/or deployed in a utility distribution circuit that can be used in the distributed control neural network system in accordance with an illustrative embodiment.

FIG. 2A shows an example edge-processing field sensor equipment 108 (shown as 108') that can be installed and/or deployed on the secondary low-voltage side of a distribution transformer (e.g., 202). The field sensor 108' can be deployed for data collection over a period of time or for continuous monitoring. The field sensor 108' can acquire voltage potentials at high-speed voltage sampling and can report voltage variations, e.g., via a cellular data connection if the RMS voltage deviates from the nominal voltage level. An example field sensor is a VoltSense™ device (manufactured by TAV Networks, CA) shown as 108".

The field sensor 108' in some embodiments is configured to acquire line-to-line or line-to-ground measurement. In the example shown in FIG. 2A, the field sensor equipment 108' includes input sensing circuitries 204 (shown as "240-277 VAC I/O" 204a and A/D circuits 204b) that operates with a processing unit 206 (shown as "Windows/Linux Platform" 206). The field sensor 108' can include a charging circuit system 208 (shown comprising a charger 208a and battery 208b) and a communication system 210 (shown as a "Cellular Modem" 210).

The system can report an outage event. The report may include a high-resolution record of the RMS voltage as well as the sampled voltage waveform for a selectable number of 50/60 Hz cycles preceding the trigger event (e.g., 20 cycles) and following the trigger event (e.g., 40 cycles). The field sensors 108' may be installed throughout a power distribution network several miles apart.

Multiple devices can monitor and capture (1 to 3) 120/240/480 VAC voltage and current waveforms using a combination of analog-to-digital converters (e.g., 1 Mhz ADC or higher in some embodiments) operatively coupled to a microprocessor that communicates to the network via a cellular network to provide constant monitoring of configurable trigger events and transmission of event-related data. The field sensor 108' can transmit scheduled data health packets (e.g., via 210) (e.g., every 24 hours) as well unscheduled data packets upon detection of a trigger event (e.g., a detected electrical-signal anomaly determined via anomaly detection locally computed by a reinforcement-learning neural-network model 116 (shown as 116') executed in a local analytics engine 114 (shown as 114')).

In the example shown in FIG. 2A, the field sensor 108' can acquire a high-resolution record of the RMS voltage 214 as well as the sampled voltage waveform 216 for each of the phases (shown as "Phase 1-2 Voltage" 216a, "Phase 2-3 Voltage" 216b, "Phase 3-1 Voltage" 216c).

The field sensor 108' can retain, e.g., up to 300 cycles of data (5 seconds) or longer in a local storage device 144. Events can be voltage or current threshold, preprogrammed time values, or events triggered. Data Logger Function: Pre- and Post-Trigger data capture is configurable with a wide range In the example shown in FIG. 2A, field sensors 108' includes a voltage sag monitor that can be detected via a low voltage cutoff circuit 212. The voltage sag monitor can make a direct electrical connection during its installation with one to three phases of energized lines and with the ground or neutral line if present.

In other implementations, edge-processing field sensor equipment 106 (not shown) can be installed in substations or the high-voltage side of the electric distribution network.

The front end of the input sensing circuitries 204 and service connection point may include fuse protection and MOV high voltage transient protection. The MOV can be connected, e.g., a line to line in a delta configuration and line-to-neutral in a Wye or single-phase configuration. The input sensing circuitries 204 may include a pre-scaler circuit configured to reduce the voltage to a safe and measurable level for the ADC. The various circuits may include jumpers to adjust ADC configurations, e.g., to maximize ADC accuracy and dynamic or acquisition range. Differential Op-Amps (e.g., in 204b) may be utilized to isolate line voltages and allow simultaneous line measurement between phases on either a three-phase Wye or delta measurement configuration. Outputs from op-amps (e.g., in 204b) may be directly outputted into corresponding ADC input ports located on a processing unit 206 (e.g., Linux Processor Board) (e.g., having usable and thus measurable voltage range from 0V to 3V). The processing unit 206 may employ a Linux operating system (or other OS systems) that executes instructions for controls operations, global timing, and communications backhaul for the unit (e.g., 108'). The processing unit 206 can also monitor the unit's environmental conditions via local sensors that monitor for temperature, humidity, water detection, and temperature profiles. The processing unit 206 can include a GPS module on board to provide a location and time-related functionality.

Processing unit 206 is configured to execute instructions for the local analytics engine 114' and reinforcement-learning neural-network model 116'. In its most basic configuration, Processing unit 206 includes at least one processing circuit (e.g., core) and system memory. Depending on the exact configuration and type of computing device, system memory may be volatile (such as random-access memory (RAM)), non-volatile (such as read-only memory (ROM), flash memory, etc.), or some combination of the two. The processing unit 206 may be a standard programmable processor that performs arithmetic and logic operations necessary for the operation of the computing device. As used herein, processing unit and processor refers to a physical hardware device that executes encoded instructions for performing functions on inputs and creating outputs, including, for example, but not limited to, microprocessors (MCUs), microcontrollers, graphical processing units (GPUs), and application-specific circuits (ASICs). Thus, while instructions may be discussed as executed by a processor, the instructions may be executed simultaneously, serially, or otherwise executed by one or multiple processors. The processing unit 206 may also include a bus or other communication mechanism for communicating information among various components of the computing device. In some embodiments, the processing unit 206 is configured with co-processors (e.g., FPGA, ASIC) or AI-processors.

Communications backhaul subsystem (e.g., 210) can employ LTE communication via onboard LTE modem, Bluetooth, Wi-Fi, and Ethernet, or wired or wireless operation, that can connect to a variety of communication and network equipment. The power supply can include a primary power supply module that is configurable to connect either Line-to-Neutral or Line-to-Line with a maximum voltage of 305 VAC. The power supply system may include a bank of super-capacitors configured to provide backup operation for normal operations ranging from 15 min to several hours depending on processor operating mode. The processing unit 206 may include (i) low voltage shutdown circuitry to provide hysteresis and minimize undesirable low voltage effects and (ii) current limiting circuitry (e.g., distributed capacitors) to reduce internal current surges.

Example Foliage Impingement Detection and Localization

Figure 2B:
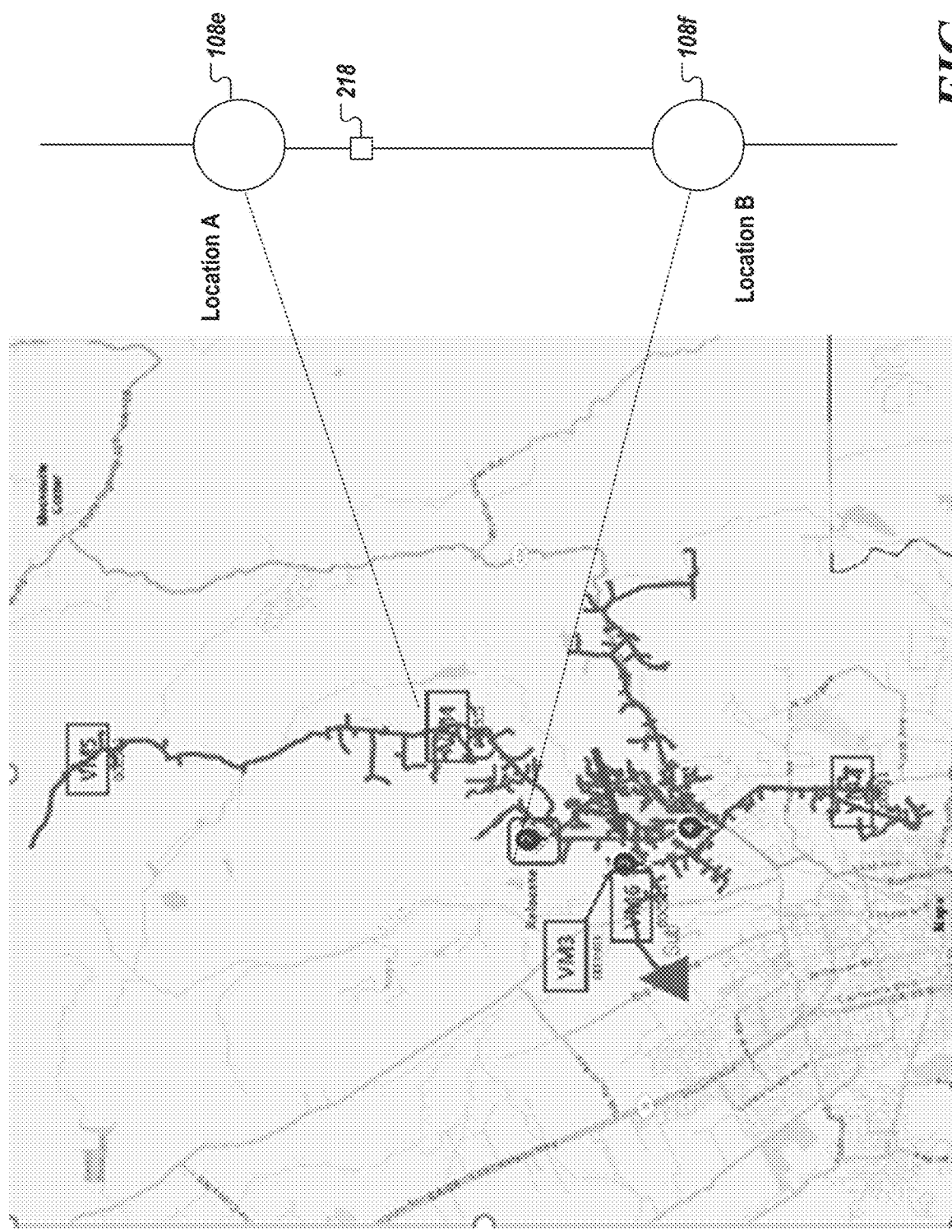
FIG. 2B shows an example foliage impingement detection and localization operation that can be performed by the distributed control neural network system in accordance with an illustrative embodiment.

FIG. 2B shows an example foliage impingement detection and localization operation that can be performed by the distributed control neural network system. Upon one or more local analytic engines (e.g., 114) providing identifiers (e.g., in message 120) associated with an anomaly to the network-wide analytics engine 104, the engine 104 can determine from its global reinforcement training whether to issue a notification or report (e.g., 128) of a foliage impingement event.

To determine the location of the anomaly, the network-wide analytics engine 104 can perform a triangulation-based operation based on the identifier and location of the sensed anomaly. In scenarios in which the network-wide analytics engine 104 receives multiple messages from multiple edge-processing field sensor equipment 108 in which each edge-processing field sensor equipment 108 observed an anomaly from different vantage point or perspective in the power distribution network, the strength of the anomaly can be employed to assess the source of the anomaly in terms of its physical location. The localization may be performed based on a triangulation operation that is constrained (e.g., having to be within pre-defined proximity) to a physical model or geographic constraint of the power distribution network.

In the example of FIG. 2B, in a first scenario, if the network-wide analytics engine 104 receives the same identifier from two edge-processing field sensor equipment 108 (shown as 108e and 108f) having an assessed anomaly signal strength or score of "0.430" and "0.021," respectively (in a scale of 0 and 1), the ratio $$\frac{Score_A}{Score_A + Score_B}$$

of the score indicates the anomaly is located 0.9534 unit distance (e.g., electrical or impedance-base distance) signal location or electrical-characteristics location (shown as 218) between location "A" associated with equipment 108e and location "B" associated with equipment 108f. In the example of a uniform impedance line that is spaced, e.g., over a 10-mile cable, connecting between location "A" and location "B", which may be 9 miles apart, the anomaly is located at 0.465 miles or 2455 feet from equipment 108e. The distance can be normalized or mapped based on the length and routing of the distribution line to determine the physical location of the anomaly. Based on this information, the map information or GIS information for the anomaly may be provided to a maintenance crew to address foliage impingement at that location. Similar notification or report can be generated for abnormal power flow loading, infrastructure failure, and predictive failure conditions to schedule preventive maintenance of power distribution equipment and/or components at such locations.

Example Implementation of GAIN Neural Network for Foliage Impingement and Anomaly Detection Neural network-based models and other machine learning models can be used to prioritize maintenance and guide foliage management to prevent power outages and fire. An exemplary GAIN model is provided that can perform reinforced learning operations with incoming data that is recorded from the sensors to identify disparities (e.g., anomalies) in the data stream to isolate critical events such as fire and power outages. The model may be optimized to receive input from multiple data sensors such as weather sensors, voltage, current, and other information related to the power outage. Since the neural network-based model is locally defined and developed with various incoming data streams for a given sensor and is configured by reinforcement learning operation over a period of time (e.g., continuous basis) of a given local sensor, the resulting neural network-based models can avoid traditional machine learning issues associated with underfitting and overfitting, etc.

Figure 3:
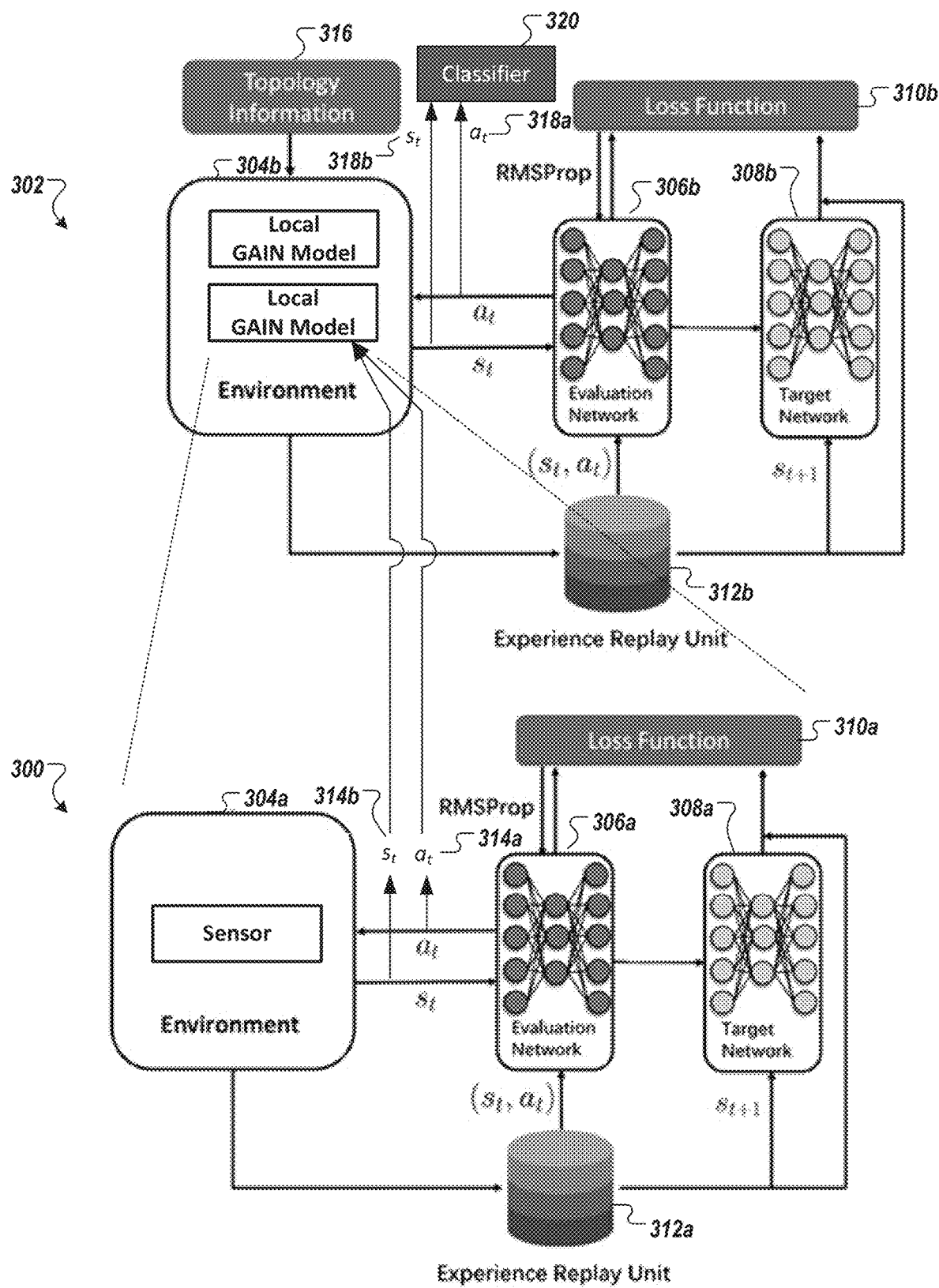
FIG. 3 shows an example implementation of (i) a local GAN-based neural network as a deep Q-learning network executing at the edge computing device and (i) a global GAN-based neural network executing at the network-wide analytics engine in the distributed control neural network system in accordance with an illustrative embodiment.

FIG. 3 shows an example implementation of a local GAN-based neural network 300 as a deep Q-learning network executing at the edge computing device 114 and a global GAN-based neural network 302 executing at the network-wide analytics engine 104. Each of the GAN-based neural networks (300 and 302) is configured as a deep Q-network reinforcement learning and deep convolution generative adversarial network.

Deep Q-Learning network employs a set of neural networks (shown as "Evaluation Network" 306 (shown as 306a and 306b) and "Target Network" 308 (shown as 308a and 308b) as a Q-function approximator of Q-values (e.g., Q(s, a, θ)), where s and a are action and state pairs, and θ is a training parameter. The action at can be defined per Equation 1. The neural networks (704, 706) can seek to minimize a loss function 708 at each step t. The target network can employ the training parameter θ from several iterations ago in reference to $S_{t+1}$.

$$a_t = \begin{cases} \max_a Q(s_t, a, \theta), \text{ with probability } (1 - \in) \\ \text{a random action, wtih probability } \in \end{cases} \quad \text{(Equation 1)}$$

As shown in FIG. 3, each of the GAN-based neural networks (300, 302) includes an environment 304 (shown as 304a, 404b) and an actor comprising an evaluation Q-network comprising the evaluation networks (306a, 306b) and target Q-network (308a, 308b), loss function 310 (shown as 310a and 310b), and experience replay unit 312 (shown as 312a and 312b) configured to perform anomaly detection as an action. The Q-network quantifies a long-term accumulative reward in a Markov decision process in which an instantaneous reward is determined based on action $a_t$ at state $s_t$.

In training mode, the evaluation Q-network generates predicted Q-values of state-action pairs (shown as $s_t$ and $a_t$) to the loss function 310 and the target network 308. The target network 308 labels the evaluation network 306 using reward parameters $r_t$. The loss function (310a, 310b) calculates the difference between the output of the target network 308 and the prediction of the evaluation network 306, e.g., using a gradient descent algorithm to provide outputs that adjust the weights to the target and evaluation networks (306, 308) that minimize the calculated loss values. The reinforcement learning operation (performed by 306, 308, 310, 312) optimally selects actions to maximize the overall reward in the long term.

A deep Q-learning network includes an experience replay unit (312a, 312b). Experience replay unit (i) stores experiences, state transitions $s_t$, rewards $r_t$, and actions $a_t$, which are data employed in the Q learning operation, and (ii) makes mini-batches to update the neural networks in a manner that can break harmful or undesired correlations in the learning. In other words, Experience replay unit 710 facilitates the learning from individual tuples over multiple training instances by recalling rare occurrences of interest to make better use of previously observed experiences. Experience replay unit (312a, 312b) can sample a small batch of tuples (e.g., state transitions, rewards, and actions) from a replay buffer to update the neural networks. At each time step of data collection, the transitions are added to a circular buffer of the experience replay unit. Then during training, the loss and stochastic gradient descent in the Q-learning operation are computed using a mini-batch of transitions sampled from a replay buffer, thereby reusing each transition in many updates, e.g., to improve stability using uncorrelated transitions in a batch.

In non-training mode, the output 314 (shown as action $a_t$ 314a and state $s_t$ 314b) of the evaluation Q-network of the local GAN-based neural network 300 is provided to the global GAN-based neural network 302. Global GAN-based neural network 302 is configured to receive the output 314 from the local GAN-based neural network 300 when a potential anomaly is detected there. In alternative embodiments, the output 314 is provided as an identifier and score. The global GAN-based neural network 302 is trained, via reinforcement learning, to determine the presence of an anomaly corresponding to foliage impingement, abnormal power flow loading, infrastructure failure, and predictive failure. The global GAN-based neural network 302 employs topology information 316 having location or GIS information associated with the local GAN-based neural network 300 executing at a given edge-processing field sensor equipment 108 to perform a localization operation, e.g., as described in relation to FIG. 2B. The output 318 (shown as action $a_t$ 318a and state $s_t$ 31b) of the global GAN-based neural network 302 are passed to a classifier 320 such as a CNN or Capsule Neural network. The classifier 320 is configured to classify the fault location as well as the type of anomaly. In alterative embodiments, classifier 320 can be a decision tree classifier, a Naive Bayes classifier, a K-nearest neighbor classifier, a support vector machine classifier, or various artificial neural networks.

Q-Learning employs Q-functions (also referred to as state-action value function) of a classification operation that measures the expected return from a state $s_t$ by first taking action $a_t$, then followed by the classification operation. The optimal Q-function can be defined as the maximum return that can be obtained starting from observation s, taking action a, then followed by the classification operation.

Figure 4:
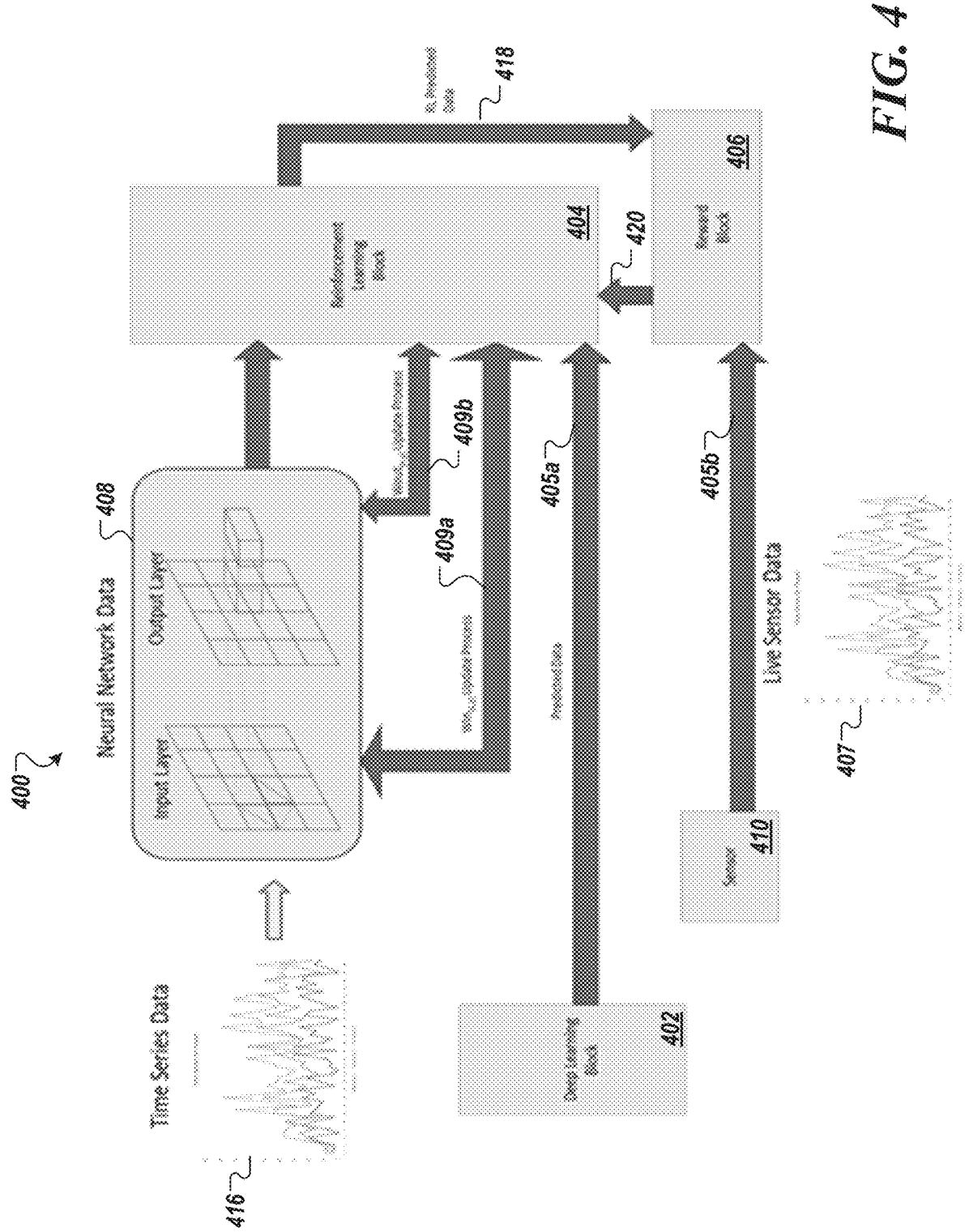
FIG. 4 shows the GAN-based neural network configured as a generative adversarial imputation network (GAIN) in accordance with an illustrative embodiment.

FIG. 4 shows the GAN-based neural network 400 (previously shown as 300 and 302) configured as a generative adversarial imputation network (GAIN) with a capsule network or other neural networks such as a convolutional neural network or a regression neural network. The GAN-based neural network 400 can be deployed in an edge device, e.g., a voltage sag monitoring device (e.g., 108, 108') or other field sensor devices as described herein and at the global GAN-based neural network 302.

In FIG. 4, the GAN-based neural network 400 includes a deep learning block 402 that operates with a reinforcement learning block 404 and reward block 406, which collectively provide a generator 412 (see FIG. 6) and a discriminator 414 (see FIG. 6) for GAN-based reinforcement learning operation.

During learning operation, the inputs 405 (shown as 405a and 405b) to the reinforcement learning block 404 include one of randomly sampled generator sensor data 416 produced by generator 412 (of the deep learning block 402) and the training sensor data 407 from the sensor 410. The discriminator 414 (executing in the deep learning block 402 and the reinforcement learning block 404) distinguishes whether the sampled inputs 405 are real (i.e., associated with training live sensor data 408) or fake (i.e., associated with generated sensor data 416). Within the GAN-based architecture, the generator 412 (executing in the deep learning block 402 and the reinforcement learning block 404) is trained to deceive the discriminator 414, and the discriminator 414 is trained not to be deceived by generator 412 in an adversarial manner. Learning operations can be performed continuously in some embodiments. In other embodiments, the learning operation is performed bi-monthly or monthly, for example, per available computation resources of the device.

In non-learning mode, the deep learning block (e.g., 402) of the edge computing device 114 includes a reinforcement-learned model comprising the neural network and classifier that is configured to provide an output indicating the presence or non-presence of an anomaly and an associated score. The deep learning block (e.g., 402) of the network-wide analytics engine 104 includes a reinforcement-learned model comprising the neural network and classifier that is configured to provide an output indicating presence or non-presence of foliage impingement. The deep learning block (e.g., 402) of the network-wide analytics engine 104 can also provide an output indicating the presence or non-presence of abnormal power flow loading, infrastructure failure, and predictive failure for power equipment.

In the example shown in FIG. 1, the reinforcement learning block 404 can observe and maintain a present state of an environment. For each time set t, it takes action $a_t$, receives a reward $r_t$, and the environment $s_t$ to predict a next state $s_{t+1}$. The process is repeated, and each batch of state, action, and reward forms one trajectory of the environment. The agent is configured to maximize its total expected reward obtained in one trajectory. Reinforcement learning block 404 includes a reinforcement layer that compares generated data from generator 412 to that of the live sensor data 408 to modify the weights (in memory 408) of the capsule network (shown as 409a, 409b).

The reward block 406 receives time-series data 408 from a sensor block 410 collected from sensors (e.g., 112) and predicted data 418 from the reinforcement learning block 404 to calculate a reward parameter 420 that is provided to the reinforcement learning block 404. Q-Learning employs a Q-function that updates state-action values by a policy to measure an expected return or discounted sum of rewards obtained from state $s_t$.

GAN-based neural network 400 includes a neural network data memory 408 that stores weights as either a convolutional neural network, a capsule network, or other neural networks (e.g., regression networks and others described herein) for the deep learning block 402. In the neural network data memory 408, a network layer is used on the incoming dataset. The network data memory 408 of the deep learning block 402 is configured to provide continuous imputed inputs to the discriminator model 414, mitigating issues associated with missing data in certain GAN-based models. A generative adversarial network with imputation is referred to as a generative adversarial imputation network (GAIN). Deep learning block 402 can classify and make predictions based on a provided time series data to identify certain features in the time series data. In some embodiments, the deep learning block 402 can be implemented as an LTSM network coupled to (i) a convolutional neural network or capsule network and (ii) a classifier.

A capsule network is a specialized neural network that can be implemented in generator 412 and/or the discriminator 414 to store different information about a signal or feature that is assessed the input data with reduced dimensionality into primitives, which can be used by the neural network to normalize features for variations in shapes, size, orientations, change in phase shift. Capsules in a capsule network are each configured to output a vector that can selectively choose its parent node in a parent layer. For each potential parent node, the capsule network can increase or decrease the connection strength using routing by agreement (e.g., to add invariance for primitive routing).

Example Deep Learning Block

FIG. 5A shows an example implementation of the deep learning block 402 (shown as 402') of FIG. 4 in accordance with an illustrative embodiment. In this example implementation, the deep learning block 306' includes a data-pre-processing data augmentation module 502, two or more LSTM layers 504 (shown as "LSTM Layer 1" 504a and "LSTM Layer 2" 504b), a set of neural network layers 506, an activation layer 508, and a classification layer block 510 (previously shown as 320). The LSTM layers 504 are used to and make predictions based on time-series data 407 (shown as 407') received from the sensor 410 (see FIG. 4). LSTM is a type of regression neural network configured to learn long-term dependencies. Each LSTM layer is configured in a chain-like structure having multiple gated layers to its cell state. Neural network layers 506 can be a convolutional neural network (CNN) or a regression neural network (RNN). The activation layer 508 can be a softmax or a ReLu layer configured to constrain the output of the neural network layers to −1 to 1 or 0 to 1. Capsule network (not shown) may be considered to be executing between activation layer 508 and the classification layer block 510.

Figure 6:
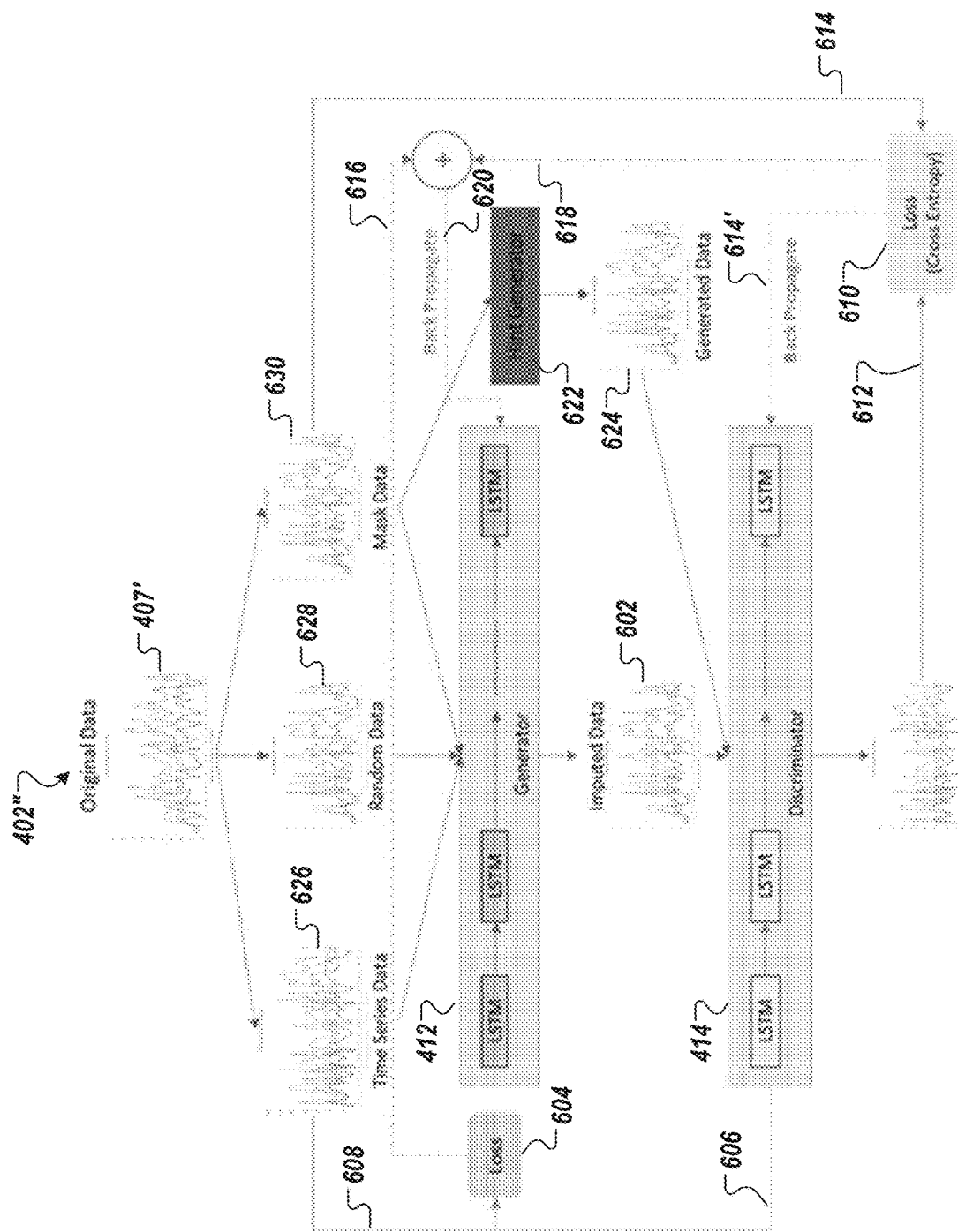
FIG. 6 shows a configuration of the deep learning block of FIG. 4 configured in a generative adversarial imputation network in accordance with an illustrative embodiment.

GAIN Network. FIG. 6 shows the non-training configuration of the deep learning block (e.g., 402, 402') configured in a generative adversarial imputation network. In FIG. 6, the deep learning block 402" includes the generator 412 and discriminator 414, each comprising a set of LSTM layers 504. The generator 412 receives the input data 407' and generates imputed data 602. The imputed data 602 is generated by LSTM layers of generator 412 such that there is no missing data and is provided to the LSTM layers (e.g., 504) of the discriminator 414. The deep learning block 402" includes a loss function 604 that calculates a difference between the output of the discriminator 414 and the input 402". The deep learning block 402" includes a second loss function 610 (shown as "Loss (Cross Entropy)" 610) that calculates a cross-entropy loss between the output 612 of the discriminator 414 and the input 402". The output 616 of the loss function 604 and the output 618 of the second loss function 610 are summed via a sum operator 620 and provided as a back propagation input 622 to the generator 412. The output 614 (shown as 614') of the second loss function 610 is also provided as a back propagation input to the discriminator 414.

A deep learning block (e.g., 402, 402') includes a hint generator 622 that provides generated data 624, bypassing the generator 412 to the discriminator 414. Capsule network (not shown) may be considered to be executing between generator 512 and the provided data (626, 628, 630).

Figure 7:
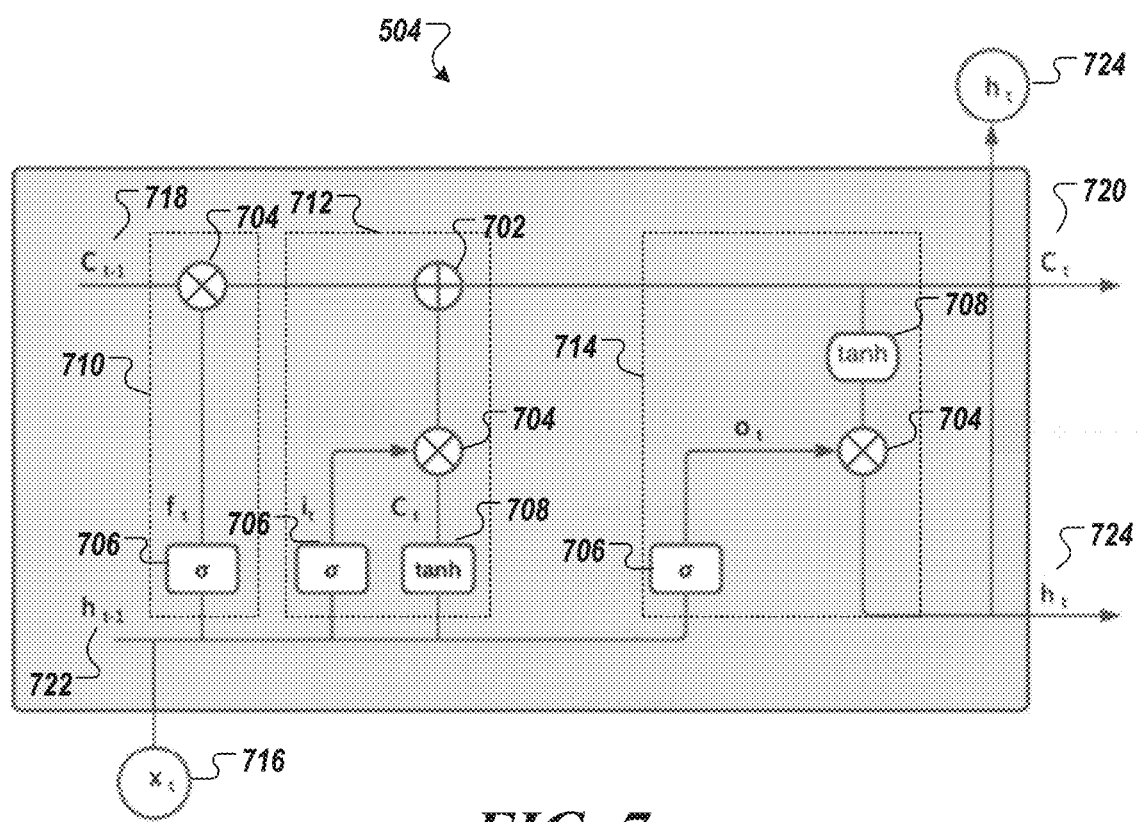
FIG. 7 shows an example LSTM network employed in the deep learning block of FIG. 5A or FIG. 6 in accordance with an illustrative embodiment.

LSTM Network. FIG. 7 shows an example LSTM network 504 (also referred to as an LSTM cell 504) shown in FIGS. 5 and 6. An LSTM cell 504 can remember information over long time intervals (e.g., longer than comparable RNN layer). Thus, the LSTM cell is suitable for anomaly detection in which there often exists a lag in informative data depending on the length of input data. Standard addition and multiplication nomenclatures are shown (702, 704, respectively). Sigmoid nonlinearity function "σ" (706) outputs a value between "0" and "1" to describe how much of each component should be let through. The tanh operators (708) are hyperbolic tangent nonlinearity functions. The LSTM network forms a forget gate 710, an input gate 712, and an output gate 714. The input to the cell, $x_t$, (716) is added with the previous hidden state, $h_{t-1}$, and passed to the forget gate 710, the input gate 712, and the output gate 714. The previous cell state, $c_{t-1}$, (718) is updated by the forget gate 710 and the input gate 712 with relevant old information and new current information, respectively. The updated cell state, $c_t$, (720) along with the previous hidden state, $h_{t-1}$, (722), and the current input, $x_t$, (716), are used to generate the new hidden state, $h_t$, (724) as the output.

Pre-processing block. To increase the rate of adaption and continuous ongoing learning by the generative adversarial-based networks, deep learning block 402 can operate with a processing data augmentation module 502 (FIG. 5A) that is configured to perform non-local fractional derivative or convolution operation to generate additional input signals that put emphasis on abnormal power lines events. In FIG. 6, the processing data augmentation module 502 is shown to provide the input time series data 626 (from input signal 407') to the generator 412. In addition, the processing data augmentation module 502 is shown to generate a random data 628 and a mask data 630 to provide to the generator 412. Generator 412 can sample from the outputs of the processing data augmentation module 502. In the example shown in FIG. 6, the loss function 604 is shown to generate its loss calculation from the input time series data 626, and the second loss function 610 is shown to generate its cross-entropy loss calculation from the mask data 630.

Processing data augmentation module 502 may perform a convolutional-based calculus operation (e.g., fractional calculus) or an encapsulation neural network prior to the exemplary reinforcement learning operation to emphasize frequencies and waveforms of interest. FIG. 5B shows an example implementation of the Processing data augmentation module 502 (shown as 502a) employing a convolutional-based calculus operator (512). FIG. 5C shows an example implementation of the Processing data augmentation module 502 (shown as 502b) employing an encapsulation neural network (514).

In FIG. 5B, the convolutional-based calculus operator 512 (shown as "non-local fractional change evaluation" 512) is configured to create additional signals (e.g., data 630—see FIG. 6) for a reinforcement learning model, which is configured to detect, locate, and/or classify abnormal power lines events using an ensemble of sensors and machine learning operations.

Numerical fractional derivatives of order −1, −0.5, 0.5, 1, 1.5, and 2 may be employed to create new signals that can reveal in phase space analysis the dynamical and geometric features of the voltage and current anomalies across the power line network phases.

In the example, FIG. 5B shows an input block comprising a training sensor data 407' (shown as one or more "3-phase voltage and/or current waveforms" 407') that is provided the convolutional-based calculus operator 512.

In some embodiments, the convolutional-based calculus operator 512 is configured to perform a fractional derivative operation by performing a Fourier transform (e.g., Fast Fourier Transform) of the input waveform 407', modifying the phase angle, and then performing an inverse Fourier transform (e.g., inverse Fast Fourier Transform). This operation can introduce noise since a Fourier transform can provide a frequency output for every point in the time-series input data.

In FIG. 5C, the encapsulation neural network 514 includes a convolutional neural network 516 that is coupled to a transport module 518 that can transpose the output with a cumulative product that is followed by a filter. Convolutions have the potential to emulate many different functions and perform a fractional derivative. Table 1 shows an example implementation of the encapsulation neural network 514 in Matlab syntax (Matlab 2020b).

TABLE 1

```
function [dx] = fracDiffeq(X, derivativeOrder)
%Single lead
%Compute filter parameters
signalLength= size(X);
t = transpose((1:signalLength−1));
b = [1; cumprod((t-derivativeOrder−1)./t)];
%cumprod(A) returns the cumulative product of A starting at the
beginning of the first array dimension in A whose size does not equal 1.
%Compute convolution by brute force
u = filter(b,1,X); % output of the function is a dynamical signal
%filter(b, a, x) filters the input data x using a rational transfer
function defined by the numerator and denominator coefficients b and a.
dx = conv(u,X); % conv(u,v); returns the convolution of vectors u and v.
If u and v are vectors of polynomial coefficients, convolving them is
equivalent to multiplying the two polynomials.
```

By changing the derivative order, the function fracDiffeq performs a non FFT based convolution to compute a fractional derivative of any order designed for short signals with noise. FFT based fractional derivatives amplify noise in short signals causing distortions in higher order derivatives and Integrals. In this implementation, numerical fractional derivatives of orders −1, −0.5, 0.5, 1, 1.5, and 2 may be employed to enhance the amplitude and harmonics of slow and fast changes in voltage, current, and power. The output of the encapsulation neural network 514 can create additional signals (e.g., data 630—see FIG. 6) for a reinforcement learning model, making it easier to detect any anomalies in an input voltage, current, and/or power waveform (407').

Figure 8:
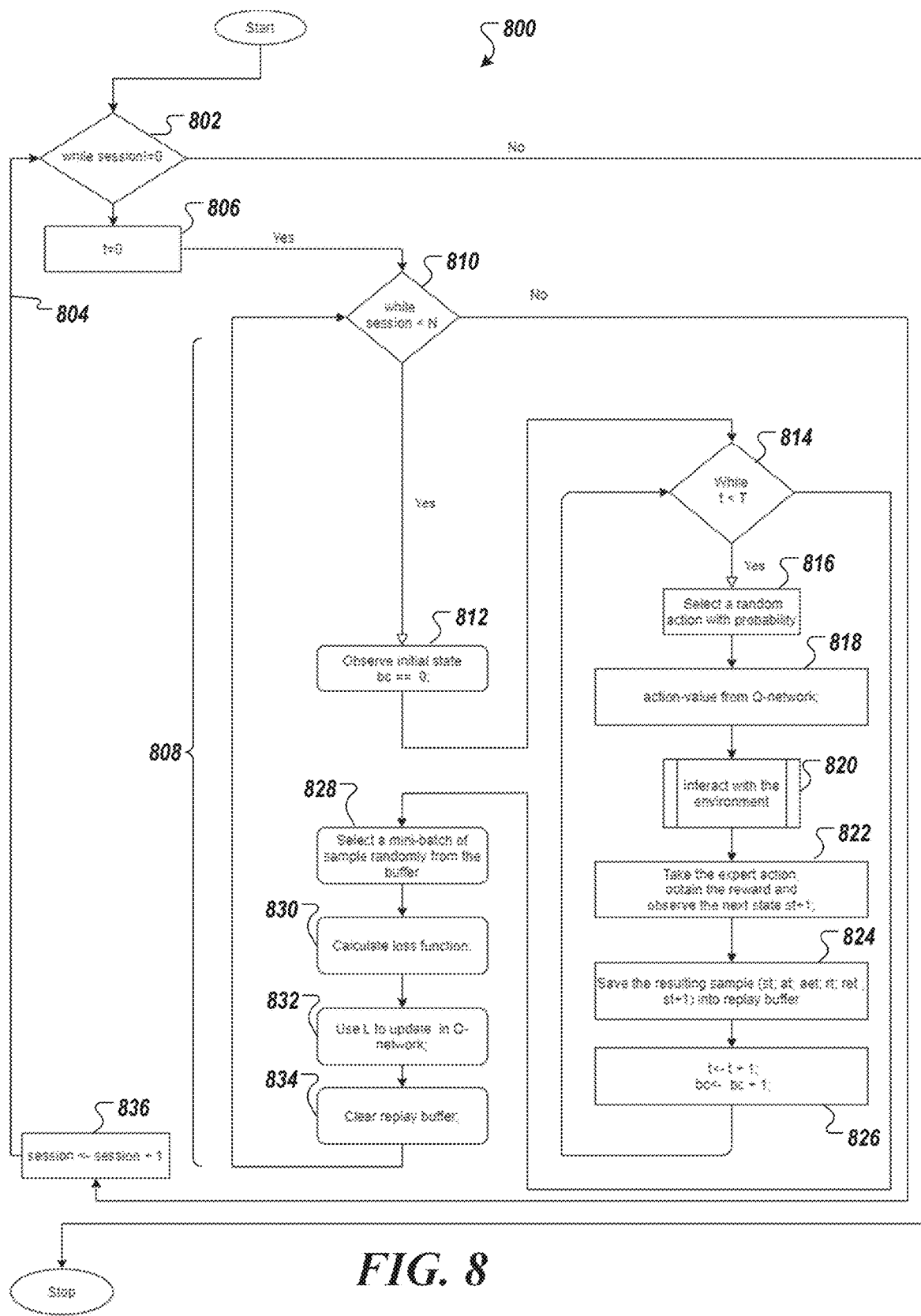
FIG. 8 shows a flow diagram of an example training operation of a global GAN-based neural network in accordance with an illustrative embodiment.

Example training operation. FIG. 8 shows a flow diagram 800 of an example training operation of a global GAN-based neural network 302. A similar set of operations can be performed for local GAN-based neural network 300. In the example of FIG. 8, the deep Q-Learning network is trained so the network can output an indication and/or estimation of the likelihood of the presence of foliage impingement at a location in the utility power distribution circuit. The output can also be used to prioritize maintenance, direct maintenance crew to the location for service, and other anomalous events described herein.

In FIG. 8, diagram 800 shows a while loop 802 that is executed based on a session value 804. For a given session, the time t is reset to 0 (t=0) (806), so the system can store only the limited burst of data needed for the LSTM cells (e.g., 504).

Diagram 800 includes an inner while loop 808 that directs the Q-network learning algorithm to execute a while loop 810 while the session number is less than N, where N is the number of LSTM cells. In the Q-network learning algorithm 808, the algorithm first observes (812) an initial state s0, which indicates the initial state of the Q-network. The algorithm also sets (812) the experience replay buffer state bc to 0 (bc==0) to reset the short-term memory state to 0.

The diagram 800 includes a while loop 814 and executes for available data to the LSTM cell (while t<T) in which T indicates the time or data size that is fixed for the LSTM cell, select action either randomly via a probability (816) or via a max action-value provided by the reinforcement layer (e.g., 404) (818). The algorithm then interacts (820) with the environment (e.g., 304) to obtain the reward $r_t$ and observe the next state $s_{t+1}$. The algorithm then performs (822) an expert action to interact with the environment and again obtains (822) the reward $r_t$ and observes the next state $s_{t+1}$. The algorithm then saves (824) the resulting sample ($s_t$, $a_t$; $ae_t$; $r_t$; $re_t$; $s_{t+1}$) into the replay buffer. Experience replay memory in reinforcement learning facilitates the agents to remember and reuse past experiences. The algorithm then increments (826) the time t and buffer bc to store the time series sequence (t←t+1; bc←bc+1). The algorithm then repeats the operations 816-826 until there are no more available data per the while loop 814.

After the while loop 814, the algorithm selects (828) a mini-batch sampled randomly from the replay buffer. The algorithm then calculates (830) the loss function to help the Q-network to recalibrate the Q network schema. The algorithm then uses (832) the calculated L value to update the Q-network and clears (834) the replay buffer (e.g., to store the next sequence of data streams). The operation 808 is then repeated for the next LSTM cell with the session number being incremented (836) (section←session+1).

Example Integration with Physics-Based Failure Models

The exemplary system and method can incorporate apriori knowledge of physics-based failure models to enhance the performance of the GAINS anomaly detection system (e.g., the anomaly detection of the local edge device or in the Network-Wide Analytics Engine). Physics-based models can be used to establish initial settings for failure event categorization. As an example, a line-to-line fault on the primary side (i.e., high voltage side) of a distribution transformer tends to drive the secondary voltage close to zero for the duration of the fault, whereas a line-to-ground fault on the primary side of a distribution transformer drives the secondary voltage toward half of the nominal voltage. The observations from these physics-based failures models can be used to set conditions for the GAINS system (e.g., i) provide training data of such events to the initial training of the reinforcement-based learning system (e.g., for 104 or 106) and/or ii) provide them in the replay experience unit (e.g., for 106)), to enhance the ability of the system to distinguish line-to-line faults from line-to-ground faults. Another example is the detection and categorization of faults associated with cracked insulators. A common occurrence with this type of fault is for the top and bottom of the AC sinusoidal waveform to become clipped when the instantaneous voltage potential is peaking due to arcing. The physics-based model can be used to provide results showing that odd harmonics are introduced into the electrical signal, leading to a priori categorization of the fault as an arcing fault by the reinforcement-based learning system (e.g., for 104 or 106).

Discussion

The electric utility industry has been working toward the development of precision, commercial-grade fault-locating tool over the past decade. To that end, the Electric Power Research Institute ("EPRI") has collected a large amount of fault data and analyzed this data using a variety of fault-location approaches. EPRI's report "Distribution Fault Location—Field Data and Analysis" [1] outlines six main methods for fault location in distribution lines: (1) Impedance to the fault, (2) Reactance to the fault, (3) Current estimation, (4) Voltage-sag estimation, (5) Takagi method, and (6) Nonlinear arc method.

The impedance-to-the-fault method estimates the absolute value of the impedance from V/I from the monitoring waveshapes. Fault possibilities are determined when the magnitude of this impedance equals the cumulative impedance in the circuit model. The reactance-to-the-fault method is based on the impedance to the fault method but employs only the reactive portion of the monitored waveforms to avoid resistance added by a fault arc. The current estimation method identifies fault location candidates by comparing the available fault current at various points with the measured fault current. The voltage-sag estimation method uses the voltage sag during the event relative to the pre-fault voltage along with a voltage divider model along the circuit to estimate fault locations. Using this method, current measurements are not needed. The Takagi method attempts to factor out the pre-fault load current and a linear arc resistance in estimating fault locations. The Nonlinear arc method considers the highly nonlinear behavior of the fault arc and derives an impedance of the line separately from the fault arc voltage.

The exemplary system and method can use data independently acquired from other sensors (i.e., employing the voltage-sag-estimation method described by EPRI) or in concert with data from current sensors (i.e., employing the impedance-to-the-fault method described by EPRI). With field sensors placed toward the end of distribution lines, fault arc voltage information can enhance i) past fault, ii) assessed voltage across the fault (i.e., the nonlinear-arc-method described by EPRI), and iii) the accuracy of fault location. If the phase relationship between voltage and current is accurately recorded, then the acquired sensor data (e.g., 216) can be used in concert with current sensor data to determine the reactance to the fault (i.e., the reactance to the fault and the Takagi methods as described by EPRI).

The exemplary system and method provide or facilitate foliage management and the assessment of impending power line infrastructure failure to reduce fire risk and minimize power outages. Competitive voltage, current, and power factor sensors currently do not employ continuous reinforcement learning with anomaly detection nor employ fractional signal calculus or incorporate data from multiple sensors along with edge computing to reduce communication cost to cloud-based data systems. The edge device can sample at a rate of 1 Mhz or more to observe complex behavior like high-frequency harmonics in power lines linked to equipment failure and/or fire risk signatures or anomalies.

The exemplary software (sensor fusion and machine learning) and hardware provide a sensitive method to detect power lines' foliage proximity and equipment problems before they occur. Current sensing devices are not predictive. They cannot observe small electric field effects and only sense direct contact with foliage or equipment failures. In contrast, the use of hybrid convolutional signal calculus anomaly detection and the use of generative adversarial nets facilitate on-the-fly learning without supervised retraining to process each data stream uniquely. The exemplary approach to fault analysis is robust and flexible to understand local events unique to the high-speed sensor system unit. The exemplary high-speed sensor data can be analyzed and processed in multiple locations depending on its properties and associations with failure signature analysis models. The GAINS model can produce responses from limited training set data when the approximation is valid, that is, when the training set contains sufficient data to provide good estimates of the underlying joint probabilities, which drives the failure and fire prediction modeling.

Traditional machine learning methods typically would involve a neural network. But training a neural network with expert examples requires large amounts of training data, and updating such a network solution on a daily basis with new situations in a timely fashion requires computer resources beyond most fire and power line distribution operations.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an," and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

The following patents, applications, and publications as listed below and throughout this document are hereby incorporated by reference in their entirety herein.

REFERENCES

[1] "Distribution Fault Location—Field Data and Analysis," Electric Power Research Institute, Final Report, December 2006, Product Number 1012438.
[2] "A Simple Method for Determining Fault Location on Distribution Lines," Thomas Covington, Tim Stankiewicz, and Rick Anderson, Fayetteville Public Works Commission, presented at 44th Annual Western Protective Relay Conference, Spokane, Washington, Oct. 17-19, 2017.
[3] "Fault Location using Distributed Sensors on Distribution Feeders," Vaibhav Donde, Daniel Partridge, and Neelofar Anjum, Pacific Gas and Electric presented at CIGRE US National Committee 2016 Grid of the Future Symposium.

What is claimed is:

1. A method to predict foliage impingement by detecting an anomalous event, the method comprising:
providing a first classifier of a first trained neural network of a first generative adversarial-based network (GAN-based network), wherein the first GAN-based network is continuously configured using (i) a first power line data set acquired by a first sensor equipment operatively placed at a low voltage-side at a first location of a utility power distribution circuit and (ii) first imputed data generated by a first generator of the first GAN-based network, wherein the first imputed data imitates data associated with an abnormal power line event;
providing a second classifier of a second trained neural network of a second GAN-based network, wherein the second GAN-based network is continuously configured using (i) a second power line data set comprising voltage, current, and/or power factor acquired by a second sensor equipment operatively placed at a low voltage-side at a second location of the utility power distribution circuit and (ii) second imputed data generated by a second generator of the second GAN-based network, wherein the second imputed data imitates data associated with an abnormal power line event;
determining, by a global GAN-based network based on a first signature received from the first GAN-based network and a second signature received from the second GAN-based network, a predicted output indicative of a presence of the anomalous event; and
outputting, by one or more processors, via a fault detection location operator using the predicted output, a location indicator indicating a distance to a foliage impingement along the utility power distribution circuit from either the first sensor equipment or the second sensor equipment;
wherein the location indicator is used to estimate foliage impingement at a location in the utility power distribution circuit.

2. The method of claim 1 further comprising:
estimating, by the one or more processors, on an ongoing basis, via a global GAN-based network, the location indicator using the predicted output.

3. The method of claim 1, further comprising:
identifying the foliage impingement at the location in the utility power distribution circuit by triangulating the location using the first signature and the second signature, wherein the triangulation is constrained to a physical layout or map of the utility power distribution circuit.

4. The method of claim 1, wherein the location indicator is used to prioritize maintenance, direct maintenance crew to the location for servicing, and guide foliage management.

5. The method of claim 1, further comprising:
obtaining, by one or more processors of the first sensor equipment, on a continuous ongoing basis, power line data comprising voltage, current, and/or power factor from sensors of the first sensor equipment; and
retraining, by the one or more processors, on an ongoing basis, via reinforcement learning operations, the first GAN-based network using the power line data.

6. The method of claim 1, wherein the first classifier of the first trained neural network of the first GAN-based network is trained from 3-phase electrical data.

7. The method of claim 1, wherein the first classifier of the first trained neural network of the first GAN-based network is trained from 3-phase electrical data evaluated through an encapsulation network, wherein an output of the encapsulation network is provided as input to the first GAN-based network.

8. The method of claim 1, wherein the first classifier of the first trained neural network of the first GAN-based network is trained from 3-phase electrical data evaluated through a state-space module that frames the 3-phase electrical data in three-dimensional data space.

9. The method of claim 8, wherein the state-space module is configured to perform a fractional calculus operation using the 3-phase electrical data to generate additional inputs for the first GAN-based network.

10. The method of claim 5, further comprising:
transmitting, by the one or more processors, the power line data to a storage area network (SAN) when the anomalous event is detected by the first classifier.

11. The method of claim 1, wherein the first classifier of the first trained neural network can classify abnormal power line events that are correlated and prioritized with foliage interaction and/or fire risk.

12. The method of claim 1, wherein the first classifier of the first trained neural network can detect foliage signatures type, locations of voltage, faults, drops, or surges/spikes on a secondary transformer in the utility power distribution circuit.

13. The method of claim 1, wherein the first classifier of the first trained neural network is further configured to output a second output associated with at least one equipment failure, line sag, and transformer failure in the utility power distribution circuit.

14. The method of claim 1, wherein the first power line data set and the second sensor equipment are further used to determine and/or monitor power flow efficiency in the utility power distribution circuit.

15. The method of claim 5, wherein the first power line data set and the second sensor equipment are further used to determine and/or monitor power factors across multiple phases at the first sensor equipment and/or the second sensor equipment.

16. A system, comprising:
one or more processors; and
a memory operatively coupled to the one or more processors, the memory having instructions stored thereon, wherein execution of the instructions by the one or more processors cause the one or more processors to:
provide a first classifier of a first trained neural network of a first GAN-based network, wherein the first GAN-based network is continuously configured using (i) a first power line data set acquired by a first sensor equipment operatively placed at a low voltage-side at a first location of a utility power distribution circuit and (ii) first imputed data generated by a first generator of the first GAN-based network, wherein the first imputed data imitates data associated with an abnormal power line event;
provide a second classifier of a second trained neural network of a second GAN-based network, wherein the second GAN-based network is continuously configured using (i) a second power line data set comprising voltage, current, and/or power factor acquired by a second sensor equipment operatively placed at a low voltage-side at a second location of the utility power distribution circuit and (ii) second imputed data generated by a second generator of the second GAN-based network, wherein the second imputed data imitates data associated with an abnormal power line event;
determine, using on a global GAN-based network, based on a first signature received from the first GAN-based network and a second signature received from the second GAN-based network, a predicted output indicative of a presence of an anomalous event; and
output, via a fault detection location operator using the predicted output, a location indicator indicating a distance to a foliage impingement along the utility power distribution circuit from either the first sensor equipment or the second sensor equipment;
wherein the location indicator is used to predict foliage impingement at the location in the utility power distribution circuit.

17. The system of claim 16, wherein execution of the instructions by the one or more processors causes the one or more processors to:
estimate, on an ongoing basis, via a global GAN-based network, the location indicator using the predicted output.

18. The system of claim 16, wherein execution of the instructions by the one or more processors cause the one or more processors to:
identify the foliage impingement at the location in the utility power distribution circuit by triangulating the location using the first signature and the second signature, wherein the triangulation is constrained to a physical layout or map of the utility power distribution circuit.

19. A non-transitory computer-readable medium having instructions stored thereon, wherein execution of the instructions by one or more processors of a remote-server or cloud-based analytical engine cause the one or more processors to:
provide a first classifier of a first trained neural network of a first GAN-based network, wherein the first GAN-based network is continuously configured using (i) a first power line data set acquired by a first sensor equipment operatively placed at a low voltage-side at a first location of a utility power distribution circuit and (ii) first imputed data generated by a first generator of the first GAN-based network, wherein the first imputed data imitates data associated with an abnormal power line event;
provide a second classifier of a second trained neural network of a second GAN-based network, wherein the second GAN-based network is continuously configured using (i) a second power line data set comprising voltage, current, and/or power factor acquired by a second sensor equipment operatively placed at a low voltage-side at a second location of the utility power distribution circuit and (ii) second imputed data generated by a second generator of the second GAN-based network, wherein the second imputed data imitates data associated with an abnormal power line event;
determine, using a global GAN-based network, based on a first signature received from the first GAN-based network and a second signature received from the second GAN-based network, a predicted output indicative of a presence of an anomalous event; and
output, via a fault detection location operator using the predicted output, a location indicator indicating a distance to a foliage impingement along the utility power distribution circuit from either the first sensor equipment or the second sensor equipment;
wherein the location indicator is used to predict foliage impingement at the location in the utility power distribution circuit.

20. The non-transitory computer-readable medium of claim 19, wherein execution of the instructions by the one or more processors causes the one or more processors to:
estimate, on an ongoing basis, via a global GAN-based network, the location indicator using the predicted output.

* * * * *